United States Patent [19]

Leary et al.

[11] Patent Number: 5,075,120

[45] Date of Patent: Dec. 24, 1991

[54] METHOD OF COOKING A FOOD PRODUCT IN A PROCESS VAPOR AT PROGRESSIVELY VARYING RATES

[76] Inventors: Steven G. Leary, 315-27th Ave., San Mateo, Calif. 94403; Clark K. Benson, 1238 Millbrae Ave., Millbrae, Calif. 94030; Andrew A. Caridis, 283 Surfbird Isle, Foster City, Calif. 94404; Daniel E. Brown, 103 Picadilly Pl., San Bruno, Calif. 94066

[21] Appl. No.: 708,000

[22] Filed: May 23, 1991

Related U.S. Application Data

[63] Continuation of Ser. No. 550,956, Jul. 31, 1990, abandoned, which is a continuation-in-part of Ser. No. 107,774, Oct. 13, 1987, Pat. No. 4,949,629.

[51] Int. Cl.⁵ .............................................. A47J 37/04
[52] U.S. Cl. ..................................... 426/233; 426/510; 426/523
[58] Field of Search ............... 99/386, 443 C, 401, 99/467, 468, 481, 495, 477, 480, 474; 126/100, 1 AE; 432/121; 426/233, 510, 511, 520, 523

[56] References Cited

U.S. PATENT DOCUMENTS

| | | | |
|---|---|---|---|
| 3,947,241 | 3/1976 | Coridis et al. | 432/121 |
| 4,154,861 | 5/1979 | Smith | 99/386 X |
| 4,164,585 | 8/1979 | Ahlgren et al. | 426/523 |
| 4,167,585 | 9/1979 | Caridis et al. | 99/443 C |
| 4,473,593 | 9/1984 | Sturgeon | 426/510 |
| 4,563,945 | 1/1986 | Hwang | 99/443 C |
| 4,569,658 | 2/1986 | Wiggins et al. | 99/443 C |
| 4,600,596 | 7/1986 | Gongwer et al. | 426/523 |
| 4,701,340 | 10/1987 | Bratton et al. | 99/443 C |
| 4,717,572 | 1/1988 | Buller-Colthurest | 426/233 |
| 4,737,373 | 4/1988 | Forney | 426/510 |

Primary Examiner—Timothy F. Simone
Attorney, Agent, or Firm—Flehr, Hohbach, Test, Albritton & Herbert

[57] ABSTRACT

An oven and method for cooking solid foods. The oven comprises an elongated housing divided into tandem cooking zones each with separate cooking and heating chambers. Food products are carried on a vapor perious conveyor through the cooking chambers as a distinct cooking process vapor is recirculated in each zone at different rates between the heating and cooking chambers. In one zone, the process vapor is circulated generally laterally of the conveyor over the food in a turbulent mode and then recirculated for reheating in a path parallel to the conveyor.

6 Claims, 5 Drawing Sheets

METHOD OF COOKING A FOOD PRODUCT IN A PROCESS VAPOR AT PROGRESSIVELY VARYING RATES

This is a continuation of No. 07/550,956, filed July 31, 1990, now abandoned, which is in turn a continuation-in-part of Ser. No. 107,774, filed Oct. 13, 1987, now U.S. Pat. No. 4,949,629, issued Aug. 21, 1990.

This invention relates to a method for cooking food products, and particularly to cooking in a steam-laden process cooking vapor applied in a plurality of cooking zones such that the heat transfer to the food products may be progressive and at varying rates permitting surface browning.

Co-inventors Andrew A. Caridis and Clark K. Benson were granted two patents which disclose a novel apparatus and process for heating and cooking foods in a closed treatment chamber, U.S. Pat. Nos. 3,947,241 granted Mar. 30, 1976 and 4,167,585 granted Sept. 11, 1979. Within the treatment chamber disclosed in those patents a moving stream of process vapor was generated and steam or water vapor was injected into the process vapor which was heated and the temperature and moisture content were controlled to pre-selected values. Food products such as chicken parts, sometimes breaded, and meat patties were placed on a wire mesh conveyor belt extending through the treatment chamber and moved therethrough in their original positions while being cooked in the surrounding and circulating cooking process vapor. Those inventions were quite successful and have been adopted by the food processing industry.

In our work we have come to recognize that it is advantageous in cooking a food product, particularly a meat product, to treat the product progressively during processing to cause heat transfer to the product at controlled varying rates, if possible. There is a recognizable improvement in the appearance of the product and a better yield when this goal is achieved. This is in contrast to applying heat to food products at a relatively constant rate over the entire cooking process. In such a case the major process controls are only cook time, temperature, and moisture content in the process vapor. A change in any of these causes an effect throughout the whole oven.

The beneficial effect of high velocity air impingement on heat transfer to a food product has been known for some time and ovens operating in accordance with such principles are in use today. However, a known shortcoming of these ovens is the difficulty of cleaning, which is highly desirable and frequently a requirement at the end of the daily production runs.

Further, it is been found that direct high velocity air impingement causes the undesirable effect of unduly drying the product, especially if the moisture content of the process vapor is low.

Direct high velocity air impingement on a production in a refreshed recirculating atmosphere does not have a chance to intermingle and thoroughly mix with the atmosphere surrounding the product. The air is only slightly mixed before it strikes the product being treated. This type of impingement is widely used in drying ovens, and is very effective in drying fabrics, paper, wood products, wallboard etc. Drying in cooking of food products is generally not desired except in making jerky and similar products.

To establish and maintain a desired moisture content in a food product, moisture is often utilized in cooking ovens and the ability to measure and control the moisture in the atmosphere surrounding or impinging the product is highly desirable. In the case of direct air impingement, maintaining the moisture of the atmosphere which impinges on the product is virtually impossible to measure and control properly. Because of this phenomena the manufacturers of direct air impingement ovens claim moisture control is not necessary in cooking ovens. It has been proven, however, that moisture control and cooking of moist products such as meats, chicken, fish, etc., is extremely beneficial.

In summary, the invention resides in a process of cooking food products in an oven including an elongated housing having an inlet for food products to be cooked in the oven and an outlet for emitting food products from the oven including passing food products into the housing upon a conveyor of generally permeable construction and applying a cooking process vapor to the food products in a first cooking zone with the cooking process vapor being circulated parallel to the path of conveyor movement. Moving the food product from said first cooking zone to a second cooking zone and applying therein a cooking process vapor to the food product in a direction generally laterally of the path of conveyor movement in a higher velocity turbulent action and then moving the cooking process vapor in said second cooking zone in a direction parallel to the path of conveyor movement and reheating the cooking process vapor in said second zone separately from reheating and refreshing the moisture containing cooking process vapor in said first cooking zone.

A general object of the invention is to provide an oven for cooking food products in a plurality of cooking zones, each separately controllable as to the temperature, moisture content and velocity of the process vapor circulating therein.

Another object of the invention is to provide an improved oven for cooking food in a steam-laden process vapor having a very high rate of heat transfer in one portion of the oven as compared to the rate of heat transfer in another portion of the oven.

Another object of the invention is to provide a process which is highly energy efficient for both cooking and browning food products in a process vapor at progressively varying rates of heat transfer to the food product.

Another object is to provide an apparatus which is adapted to the cooking and browning of a variety of product shapes including patties, links and chicken parts/pieces and to afford browning to both the top and bottom surfaces of such products substantially simultaneously.

Another object of the invention is to provide an oven wherein a cooking process vapor is generated and circulated to envelope the products to be cooked in turbulent flow for greatly enhanced heat transfer.

A further object is to provide an oven of the type described which may be easily cleaned on the interior surfaces so that the by-products of the cooking process may be removed more easily than was practical in prior art air impingement ovens.

A still further object is to provide an oven of the type described which is highly energy efficient, permitting operation at lower temperatures or shorter cooking times than prior art ovens of comparable size.

We have found that it is highly desirable to cause mixing and blending of the refreshed and recirculated product vapor prior to contact of the process vapor with the product being processed. This avoids drying out and stripping of the product as it often occurs within a high speed circulated atmosphere where air jets impinge directly upon the product. We also observed that mixing of the recirculated atmosphere is not instantaneous, and it takes time and space to obtain a homogeneous mixture of the recirculated atmosphere with the atmosphere existing in the cooking chamber. To obtain the preferred mixing, the discharge jets or nozzles, from which the recirculated atmosphere issues, are positioned laterally—to the side—of the food product being cooked. This location of the nozzle promotes induced circulation due to the energy on the jet. The jet atmosphere has space and time to mix with the surrounding atmosphere to produce a somewhat homogenous atmosphere. The product then is subjected to the homogeneous mixture which is in a turbulent state due to the tendency of the jet to set into motion large volumes in the surrounding atmosphere. We have seen that the jets will set into motion a volume several times the volume issuing from the jet nozzle, which we characterize as induced circulation. One of the benefits of the induced circulation is that it permits moisture measurement and control thus gaining better control over the temperature and moisture content in the blended atmosphere over that which previously experienced with jet direct impingement.

Further objects and advantages of the invention will become apparent from the accompanying drawings taken in connection with a detailed description of a preferred embodiment of the invention.

Figure 1:
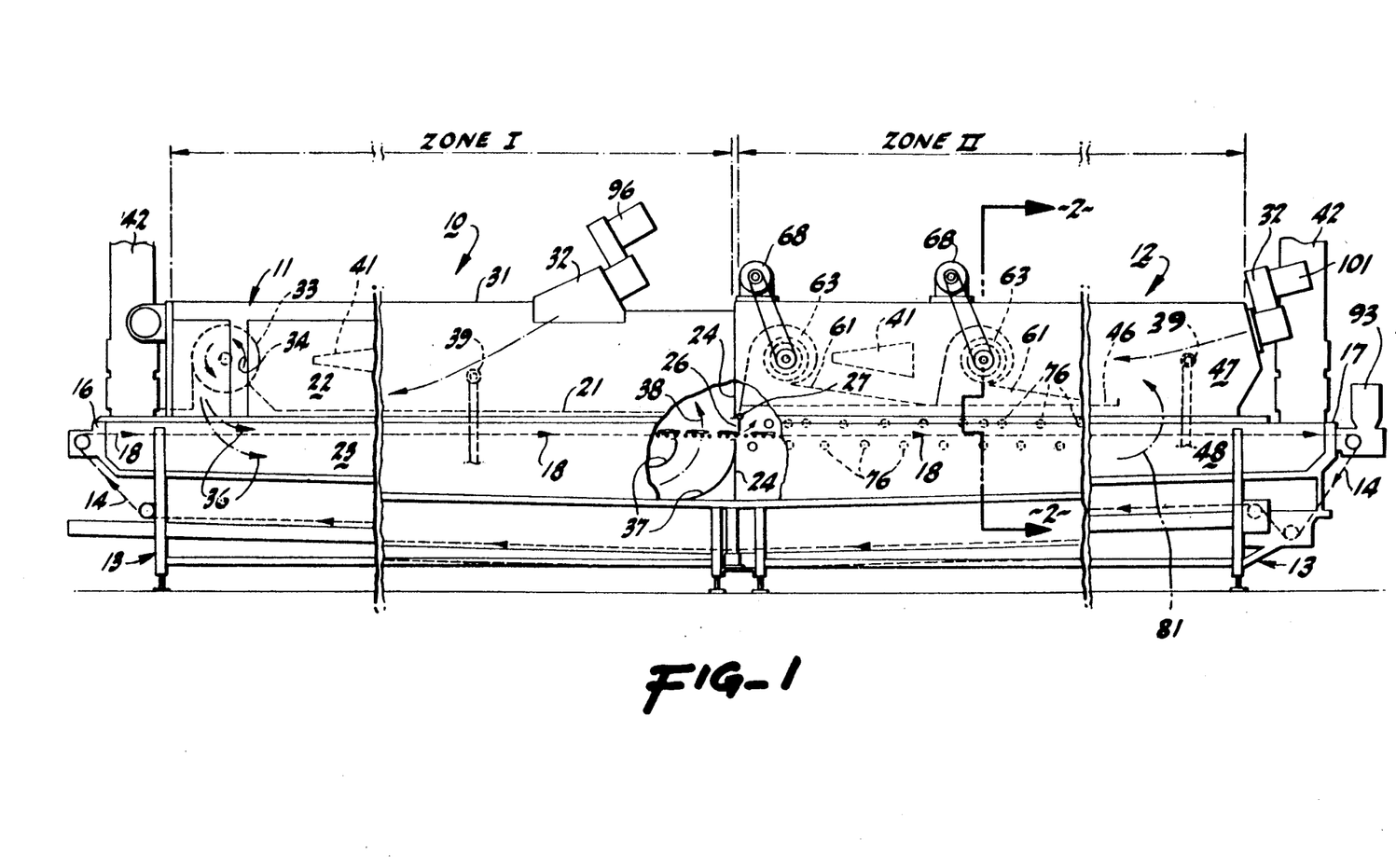
FIG. 1 of the drawings is a side elevational view, partially broken away, of an apparatus made in accordance with the principles of the present invention for performing the process of the present invention.

The oven 10 of the present invention is illustrated in the drawings, and referring particularly to FIG. 1, comprises in general a first oven section 11 and a second oven section 12 which serve to define cooking zone I and cooking zone II, respectively, for the cooking process of the present invention. The oven 10 is supported upon a framework 13 and an endless conveyor 14 is provided to convey food products from an inlet opening 16 through the oven 10 and exiting the oven at an outlet opening 17. Thus the direction of movement on the top run of the endless conveyor 14 is from the left to the right as indicated by the arrows 18.

A generally horizontal baffle 21 divides the oven 10 into an upper heating compartment 22 and a lower cooking compartment 23, the top run of the endless conveyor 14 extending through the lower cooking compartment for conveying and supporting the food to be cooked. A vertically arranged baffle 24 generally divides the oven into the first 11 and second 12 oven sections and a gap 26 in the baffle is sized to permit food to be carried from the first to the second section. The vertical baffle 24 may be equipped adjacent gap 26 with a moveable member or flap 27 to afford partial closure of the gap and serves to maintain a separation and distinction between the cooking process vapor operative in zone I from the cooking process vapor operative within zone II, which will be described more fully below.

Still referring to FIG. 1, the first oven section 11 comprises an elongate housing or shell 31 which is divisible along a horizontal plane defined generally by the horizontal baffle 21 and the housing 31 is generally arranged in accordance with the disclosure of U.S. Pat. No. 3,947,241 in that an upper shell portion may be raised from the lower shell portion to expose the interior of the oven for cleaning and servicing. A water seal (not shown) acts between the upper and lower shell portions as an explosion release and for retaining the process vapor within the oven, confining the cooking gasses against escape into the surrounding plant. A heat source 32 is arranged on the housing 31 to provide for the heating of the cooking process vapor in the upper heating compartment 22. The heating unit 32 may comprise a gas burner assembly for discharging a jet of flame and combustion gasses into the heating chamber. Alternatively, a heating unit comprised of electrically actuated heating element or heating elements energized by steam or heat transfer fluids may be arranged in the upper heating compartment 22 for heating and reheating the cooking process vapor as it is circulated by a tangential fan 33. The fan 33 rotates in the direction of the arrows 34 (counterclockwise as viewed in FIG. 1) to circulate a cooking process vapor in the direction of the arrows 36 in a path generally parallel to the movement of food on the conveyor 14, as indicated by the arrow 18. The first oven section 11 at the end proximate the vertical baffle 24 is equipped with turning vanes or baffles 37 serve to direct the cooking process vapor through the open wire mesh conveyor belt 14 into the upper heating compartment 22 where the process vapor is reheated by the heat source 32. The arrow 38 indicates the recirculation pattern of the cooking process vapor from the lower cooking compartment into the upper heating compartment. It has been found that an inconsequential amount of the process vapor from zone I is entrained into the process vapor of zone II through the gap 26 in the vertical baffle 24. The amount of process vapor passing into zone II has had no material effect on the process carried out therein.

Provision is made in zone I of the oven 10 for infusion of steam into the cooking process vapor and to that end a steam supply manifold 39 is arranged to distribute from a steam supply (not shown) a flow of steam into the cooking process vapor. The rate that steam is supplied is controlled by a system employing dry bulb and wet bulb thermocouples disposed in the oven as generally disclosed in U.S. Pat. No. 3,947,241. A wet bulb thermocouple (not shown) is arranged within the cone 41 for monitoring the moisture content of the cooking process vapor.

To maintain the moisture content of the cooking process vapor at a selected value it is necessary to prevent contamination of the vapor by entraining air such as through the inlet to the oven 16.

To this end means are provided to cause a draft to be created adjacent to the oven inlet 16 and includes a stack 42 provided with an exhaust fan (not shown). The lower of the portion of the stack overlies the conveyor belt and when the fan is operative, ambient air is swept up the stack 42 and a small component of the process vapor is also entrained therein all to ensure that the process vapor will maintain an established level of moisture without accumulation of air from the plant. A similar stack 42 is arranged at the outlet opening 17.

Figure 2:
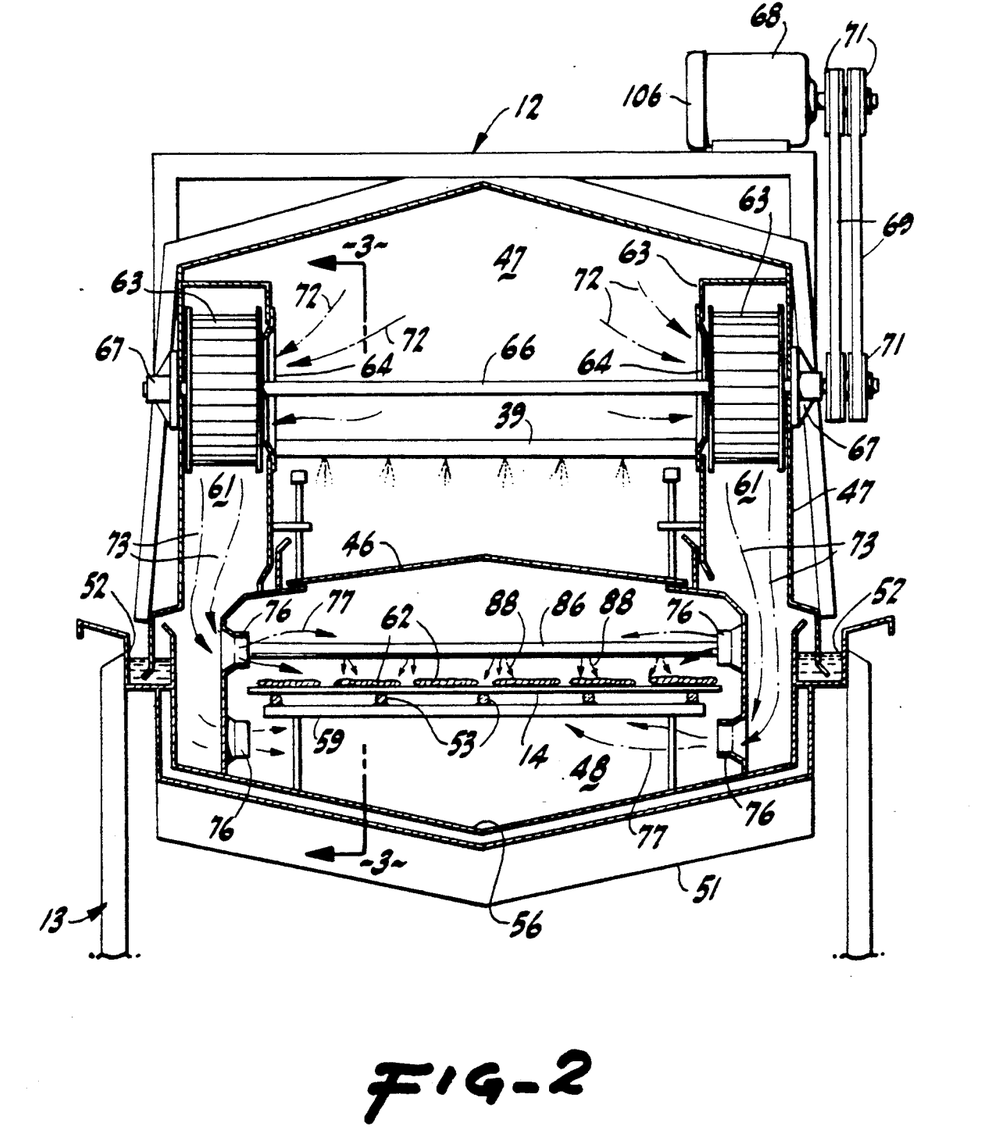
FIG. 2 is an enlarged sectional view in the direction of the arrows 2—2 of FIG. 1.
Figure 3:
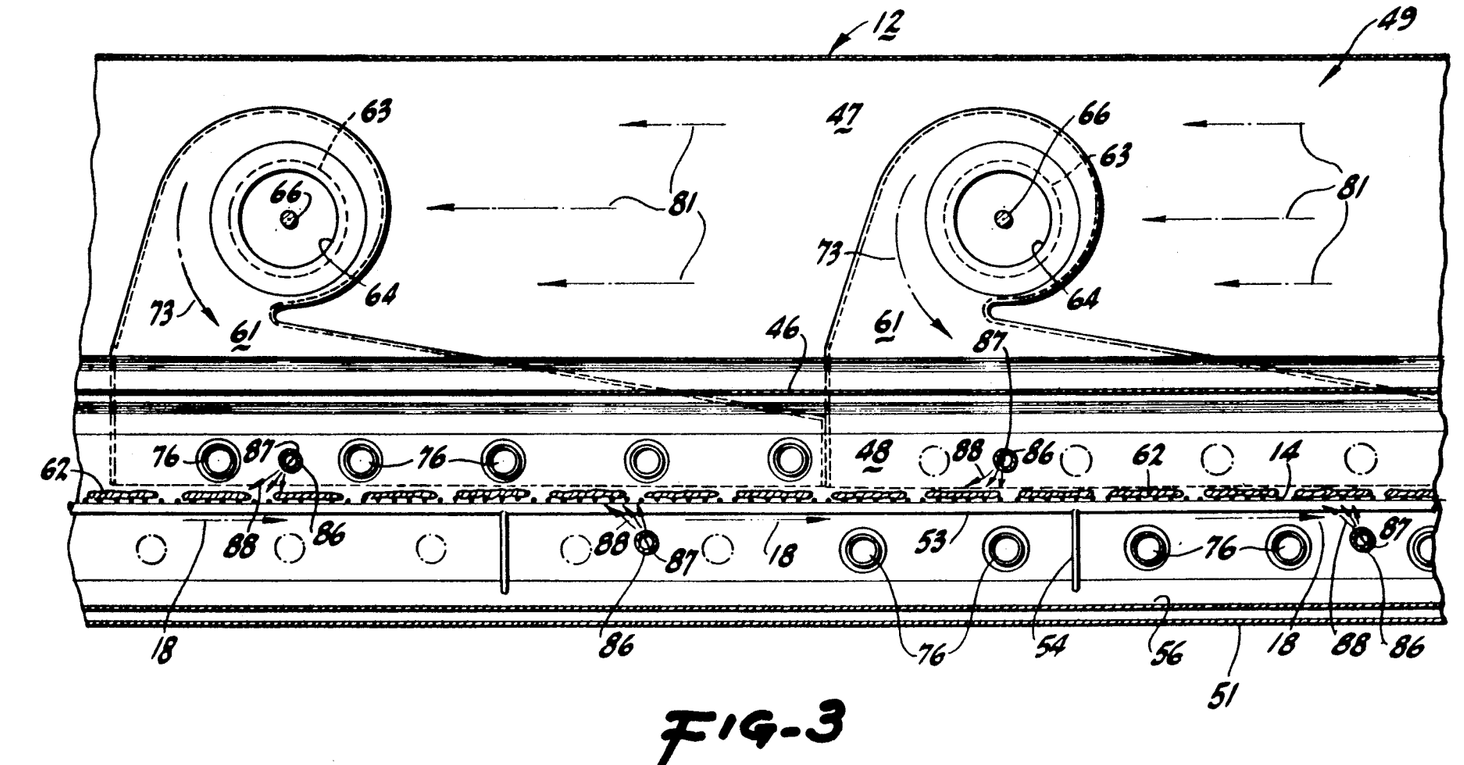
FIG. 3 is a further enlarged fragmentary sectional view in the direction of the arrows 3—3 in FIG. 2.

Referring now to FIGS. 1, 2 and 3, the second oven section 12 which encloses cooking zone II is equipped with a generally horizontal baffle 46 which serves to divide the second oven section into an upper heating compartment 47 and a lower cooking compartment 48. The second oven section 12 includes an upper shell portion 49 which contains the upper heating compartment 47 and a lower shell portion 51 which contains the lower cooking compartment, as shown in FIG. 2. A portion of the vertical sidewall of the upper shell 49 extends into a water trough 52 provided by the lower shell so as to establish a water seal, as mentioned above, between the two shell portions, 49 and 51. It will be understood that the upper shell portion 49 maybe elevated with respect to the lower shell portion 51 to afford an opportunity for inspection and cleaning of the second oven section and the arrangement for achieving this is well known in the field and consequently is not disclosed herein.

The endless conveyor 14 extends through the lower cooking compartment 48 of the second oven section 12 and is supported therein by tubular members 53 mounted on a support frame 54 which extends to the lower wall 56 of the lower shell 51. This arrangement is conventional and is also found in the first oven section 11. Similarly, the bottom portions of the lower cooking compartment is of double wall construction thus providing a channel for cooling liquid for maintaining the bottom of the oven at a relatively low temperature for the collection of drippings from the belt, preventing their burn-on to the metal surfaces.

The upper heating compartment 47 is equipped with a heat source 32, FIG. 1, which may be constructed and arranged similar if not identical to the heat source for the first oven section. In each case, however, the gas burner or electrical other heating means are independently controlled so that the heating of the first zone is independent of the heating of the second zone.

Referring now to FIGS. 2 and 3, a plurality of plenums 61 extending from the upper heating compartment 47 to the lower cooking compartment 48 serves for delivery of cooking process vapor into the cooking compartment 48. The plenums 61 are disposed in spaced-apart pairs, one on each side of the conveyor 14; thus a set of plenums would comprise two which straddle the conveyor belt 14. It is desirable to provide an oven section with several sets or pairs of plenums arranged in tandem along the conveyor 14 so that the flow of cooking process vapor may be regulated over discrete lengths of the conveyor path thus providing a large measure of control over the rate of heat transfer of the process vapor to the product 62. Two set or pairs are indicated in the drawings, but this number is only for the purpose of illustration and sets of plenums and associated nozzles, motors, etc. may be 3, 4, 5, etc. in number of sets as the application should require.

Figure 4:
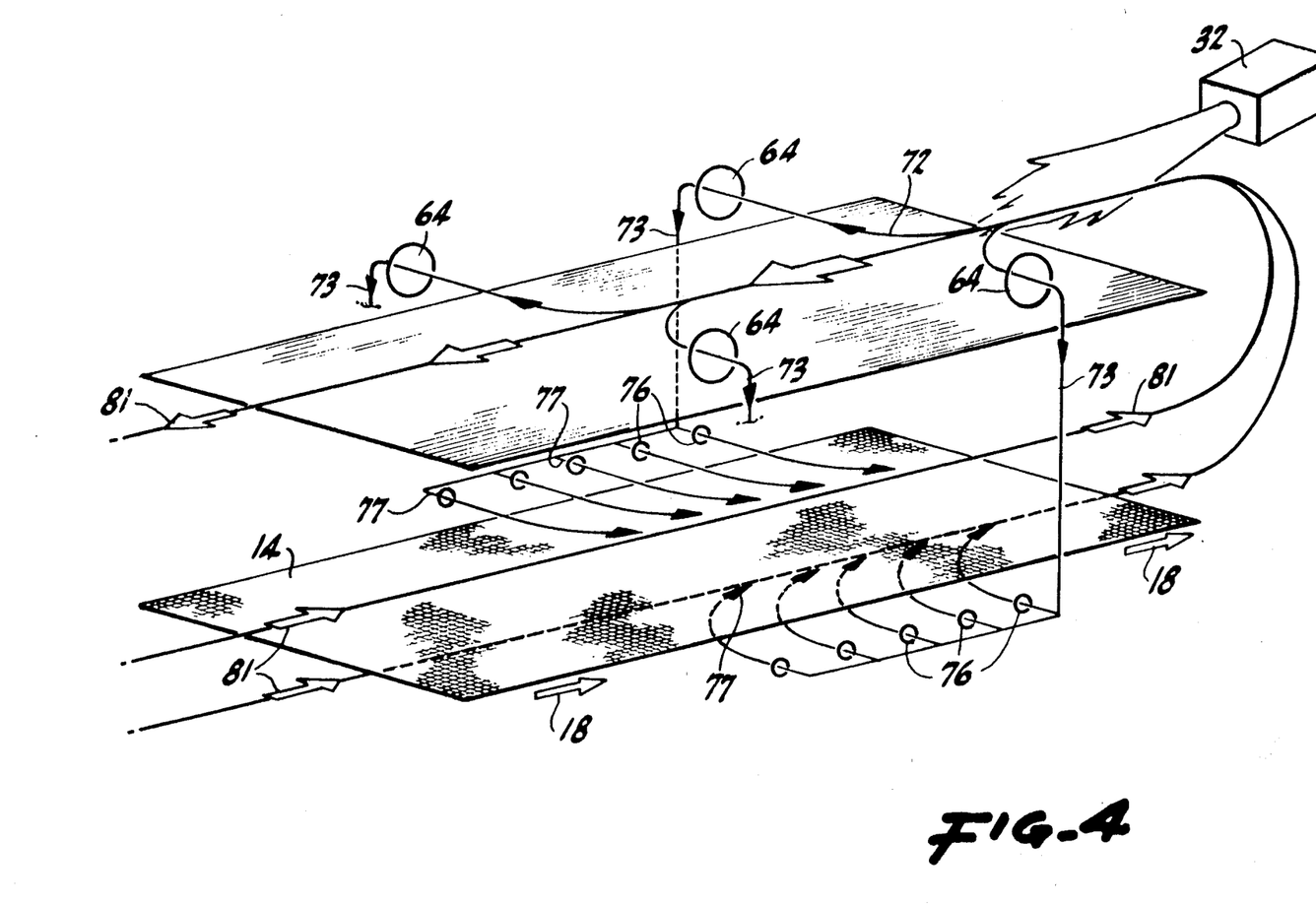
FIG. 4 is a diagrammatic view of the flow patterns of the cooking process vapor circulated in zone II of the present invention.

Referring particularly to FIGS. 2 and 3, each plenum 61 in its upper portion has the shape of a scroll or spiral which serves as the outer shell for a tangential fan 63, the intake 64 of which is open to the upper heaing compartment 47, clearly shown in FIG. 2. The rotors of the fan 63 are fixedly secured to a shaft 66 which extend laterally of the oven 10, the shaft 66 being suitably mounted in bearing supports 67 arranged on the upper shell 49 of the second oven section 12. The fan 63 is driven by a variable speed controlled electric or hydraulic motor 68 through a drive connection comprising a pair of drive belts 69 operatively reaved over the pulleys 71 mounted on the motor drive shaft and the fan shaft 66. The motor 68 rotates in the direction causing flow of the squirrel cage fan 63 to propel the cooking process vapor in the direction of the arrows 72 into the inlet of the fan, as shown in FIG. 2, urging the cooking vapor downwardly in the plenums 61 in the direction of the arrows 73 as shown in FIGS. 3 and 4.

So as to envelop the product 62 in a turbulent flow of the process cooking vapor through the pervious conveyor belt, a plurality of nozzles 76 are arranged in the lower portion of the plenum 61 in arrays such that on one side of the conveyor belt the array of nozzles projects laterally therefrom in a plane above the belt and from the opposite side of the belt an array of nozzles projects laterally of the belt in a plane generally below the belt, as shown in FIGS. 2 and 3. More specifically, the plenums 61 shown at the left hand portion of FIG. 2 presents an array of nozzles 76 for issuing the process vapor above the conveyor and product supported thereon. The plenum 61 on the right hand portion of FIG. 2 presents an array of nozzles 76 for projecting a flow of cooking process vapor laterally of and below the conveyor 14 and the products supported thereon. The process vapor issues from the nozzle in the direction of the arrows 77 to envelope the product both above and below the conveyor thereby greatly increasing the rate of heat transfer from the cooking process vapor to the product.

More specifically, the flow of cooking process vapor in zone II as indicated by the arrows 77 may be in the range of from 3,000 to 7,500 feet per minute depending on oven size. The flow of cooking vapor in zone I as indicated by the arrow 38 is generally on the order of 700 feet per minute. The net effect of the increased circulation speed in zone II has been found to be a reduction in cooking time, an increase in browning of the food product on all sides by reason of the turbulent circulation above and below the product, the use of lower cooking temperatures and a resulting savings in fuel costs.

As shown in FIG. 3, the array of nozzles 76 on the plenum shown at the left hand portion therein are disposed above the conveyor 14 and phantom circle lines indicate the array of nozzles disposed on the opposite side of the oven. The right hand portion of FIG. 3 shows a plenum 61 disposed downstream of the last-mentioned plenum and with the array of nozzles 76 positioned to project cooking process vapor below the product. Phantom circle lines thereabove indicate the position of the nozzles in the plenum 61 on the opposite side of the belt.

The rotational speeds in the fans 63 may be on the order of 2100 rpm and the fans in each of the plenum pairs may be driven either at the same speed or at different speeds to achieve particular processing objectives. The power of the fans is such as to cause a substantial draft of the process vapor which produces a flow in the second oven section, zone II, as indicated by the flow arrows 81. Thus, the turbulent flow as indicated by the arrows 77 is transformed by the draft of the fans into a general mass flow in the direction of the arrows 81 for recirculating the cooking process vapor in the second zone from the lower cooking compartment 48 to the upper heating compartment 47 where the cooking process vapor is reheated.

A steam supply manifold 39, FIG. 2, is disposed in the second oven section and is coupled to a wet bulb motorized modulating steam valve coupled to a thermocouple unit (not shown) which functions as disclosed in U.S. Pat. No. 3,947,241. The wet bulb thermocouple is positioned within the cone 41 as indicated at FIG. 11 in that patent.

During an oven cooking process, even in the presence of a cooking atmosphere saturated with steam, it has been found that fats and juices exude onto the surfaces of the food products. Certain of these liquids drip from the product into the bottom of the oven while other portions of the liquid remain on the surface of the product and inhibit the desired surface browning which gives a desired visual appeal to the product. To ensure that liquids are removed from the surface of the products, the oven 10 is provided in zone II, oven section 12 with means for sweeping liquids from the surface of the food products. More specifically, the liquid sweeping means 86 comprises a steam supply tube extending laterally across and above the conveyor 14 so as to overlie the products passing below the tube. The tube is coupled to a suitable supply of process vapor or steam (not shown) and nozzles 87 are formed in the tube to project blasts of steam in the direction shown generally by the arrows 88 for sweeping liquid from the surface of the product 62. Alternatively, the nozzles 87 may comprise a narrow slit arranged longitudinally of the tubular member 86 so that the steam may issue therefrom in a narrow sheet or curtain for removing liquid all across the belt, thereby permitting the top surface of the product to receive heat more readily from the cooking process vapor and to achieve a browned appearance.

The operation of the oven 10 is controlled as to processing time, oven temperatures and oven moisture content. Further, in zone II controls are arranged in a circuit for controlling the speeds of the motors 68 and thus the volume of process vapor circulated by the fans 63.

Figure 5:
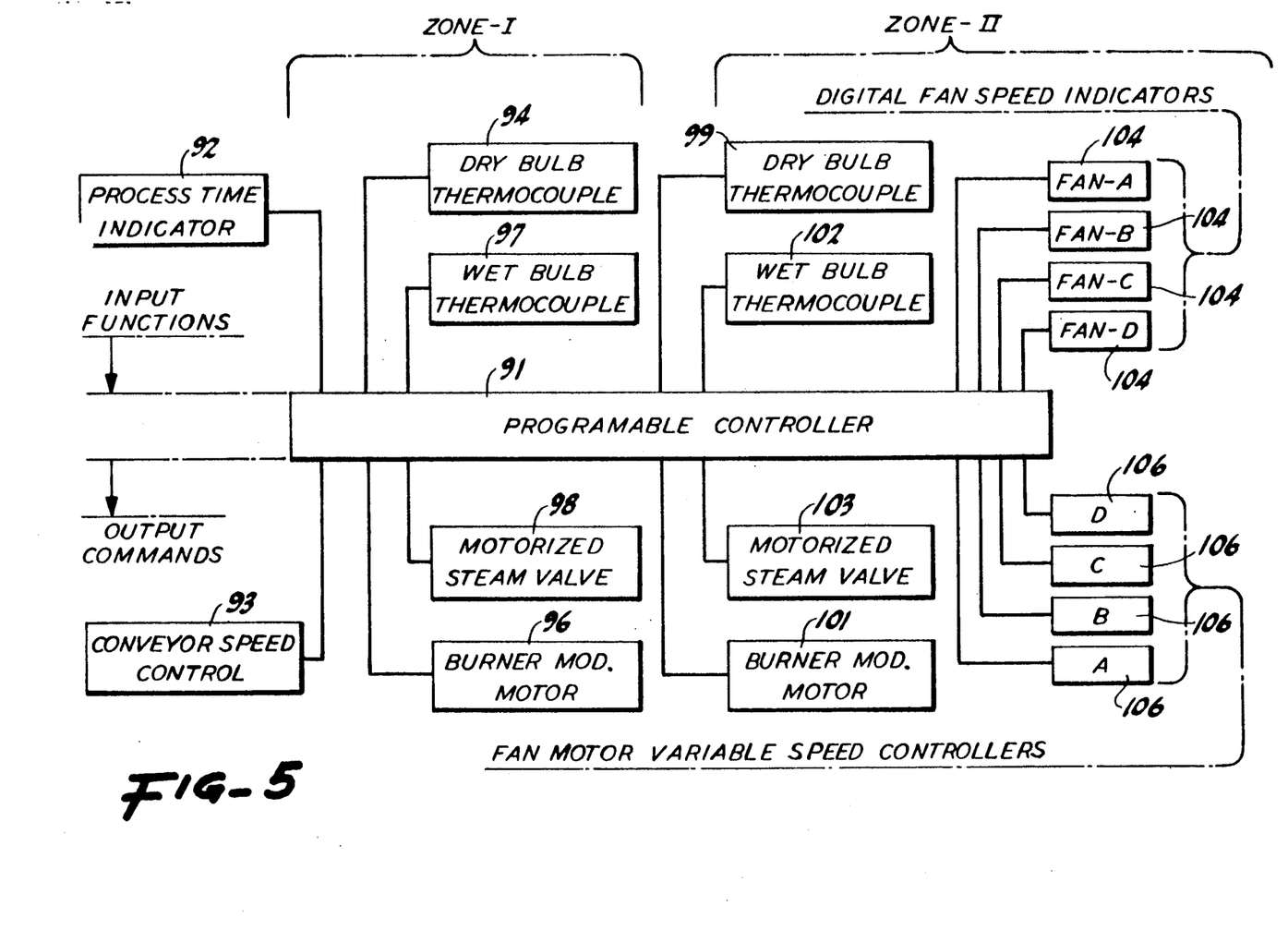
FIG. 5 is a schematic diagram of the control system applicable to the present invention.

Referring particularly to FIG. 5, a programmable controller 91 is coupled to a process time indicator 92 for controlling the speed of the conveyor 14 through the conveyor speed control 93, FIG. 1. The oven temperature in zone I is sensed by a dry bulb thermocouple 94 disposed in the path of the process cooking vapor, the thermocouple providing a signal to the programmable controller 91 for operation of the heat source 32, for example a modulating burner motor 96. The moisture content in zone I is sensed by a wet bulb thermocouple 97 positioned in the cone 41 and provides a signal to the programmable controller 91 for actuating a motorized steam valve 98 for supplying steam through the steam supply manifold 39 into zone I to maintain a selected moisture content in the process vapor circulating therein.

Zone II of the oven is also equipped with a dry bulb thermocouple 99 giving an input to the dry bulb controller 91 which in turn provides an output to the heat source 32 for actuating the burner motor 101, FIG. 1. A wet bulb thermocouple 102 positioned in the cone 41 of Zone II provides an input to the programmable controller 91 for actuation of a motorized steam 103 so as to achieve and maintain the desired moisture content of the cooking process atmosphere in zone II through supplying steam therein through the steam manifold 39, FIG. 2.

Each of the fan motors 68 is equipped with a speed indicator 104 furnishing an input to the programmable controller 91 with respect to the set fan speed. The motors for each of the fans is also provided with a fan motor variable speed controller 106 for controlling the flow rate of the process vapor through the plenums 91 and nozzles 76 for establishing turbulent flow above and below the conveyor belt 14.

It is understood that where a series of plenum pairs are provided in zone II of an oven, for example, four pairs, that the speed of the fans associated with each plenum pair may be identical or different. For example, the fans in plenum pair A would operate at a slower speed than the fans in plenum pair B which would turn slower than the fans in plenum pair C which in turn would be operated slower than the fans in plenum pair D. Thus the flow through the plenums arranged downstream would be from slow to fast and the heat transfer would also be from slow to fast. Another program would be to arrange the fan speeds from fast to slow; still another arrangement would be slow to fast to slow to achieve a particularly desired product conditioning.

The process of cooking food products at varying rates of heat transfer has been successfully applied to a large variety of food items. These include beef patties, link sausage, sausage patties, meatballs, shrimp, boneless chicken breast, chicken halves including the bone portion, breaded meat patties and toasted cheese sandwiches.

Examples with the associated results are tabulated below of products processing in a unit of the present invention having a cooking length of twelve feet from the inlet 16 to the outlet 17 and being equipped with fans units 63 including a blower wheel manufactured by Revcor, Inc., 251 Edwards Avenue, Carpentersville, Ill. 60110.

The fan wheel had a nominal diameter of 8¼" and is Revcor Model No. R85-400S. The speed at which the fan operates is indicated in the tabulated results below. Temperatures in the two cooking zones as well as the moisture content in each zone is also listed together with the cooking time and product yield in terms of percentage of the product remaining from that introduced in the unit at the inlet end. Typically the results were commercially superior in color, texture, flavor and were fully cooked to commercially acceptable standards.

| | EXAMPLES AND RESULTS | | | | | |
|---|---|---|---|---|---|---|
| | PRODUCTS: | | | | | |
| | Link Sausage | Meat Balls | Shrimp | Boneless Chicken Breasts | Bone-in Chicken Breasts | Toasted Cheese Sandwiches |
| Portion Wt/Size | 6 pieces @ 174 grams | .5 oz. | 16–20 pieces per lb | 10 pieces @ 1115 grams | 12 pieces @ 3139 grams | — |

EXAMPLES AND RESULTS
PRODUCTS:

|  | Link Sausage | Meat Balls | Shrimp | Boneless Chicken Breasts | Bone-in Chicken Breasts | Toasted Cheese Sandwiches |
|---|---|---|---|---|---|---|
| Product Initial Temp. °F. | 38 | 32–38 | 38–40 | 41 | 43 | — |
| Zone 1 Dry Bulb Temp. °F. | 525 | 240 | 325 | 385 | 400 | 350 |
| Zone 1 % Moisture | 60.5 | 66 | 63 | 62 | 61.75 | 44 |
| Zone 2 Dry Bulb Temp. °F. | 530 | 495 | 300 | 385 | 360 | 480 |
| Zone 2 % Moisture | 60.5 | 40.5 | 63 | 62 | 62 | 41 |
| Zone 2 (a) Fans (b) Speed RPM | 1700 1700 | 1700 1000 | 900 900 | 1050 1050 | 1000 1100 | 1700 1200 |
| Cooking Time - Minutes | 2.5 | 2.5 | 1.6 | 5.5 | 20 | 3.2 |
| Yield - Percent | 94 | 91 | 96 | 83 | 83.7 | — |

Considering the treatment of the meatballs as set out in the table, it will be observed that the moisture content in zone 1 at 66% was considerably higher than the moisture content in zone 2, wherein the fans operated at distinctly different speeds. The objective of cooking the meatballs in this fashion was to virtually steam cook the meatballs in zone 1 and then broil the product in a rather dry atmosphere in zone 2 to obtain a desired browned appearance of the product.

It appears that many variations are possible in the process described here and in use of the exemplary apparatus disclosed. Accordingly, it should be understood that the disclosures here are intended to be purely illustrative and not in any sense limiting.

What is claimed is:

1. A method of cooking food products in an oven including an elongated housing having an inlet for food products to be cooked in the oven and an outlet for emitting food products from the oven, comprising passing food products into the housing upon a conveyor of generally permeable construction,
   applying a cooking process vapor to the food products in a first cooking zone, the cooking process vapor being circulated parallel to the path of conveyor movement,
   moving said food product from said first cooking zone to a second cooking zone and applying therein a cooking process vapor to the food product in a direction lateral of the path of conveyor movement, and then moving the cooking process vapor in a direction parallel to the path of conveyor movement and reheating the cooking process vapor in said second zone separately from reheating the cooking process vapor in said first cooking zone.

2. The method in accordance with claim 1 including the step of applying the cooking process vapor both above and below the conveyor during actuation of the conveyor through the housing.

3. The method in accordance with claim 2 including the step of applying the cooking process vapor to the food products at two different flow rates and in a direction lateral to the path of conveyor movement.

4. The method according to claim 3 and including the further step of exposing the upper surface of the food product to a stream of steam oriented towards the product and at a velocity sufficient to remove liquids from the surface of the food product and entraining the steam so used into the cooking process vapor for recirculation and reheating within the oven housing.

5. A method of cooking food products carried along a path through an oven including an elongated housing having an inlet for food products to be cooked in the oven and an outlet of emitting food products from the oven, comprising passing food products into the housing upon a conveyor of generally permeable construction, subjecting the food products in one segment of said path to a cooking process vapor being circulated at a first velocity laterally of the path of conveyor movement in planes above and below the conveyor in a cooking zone, the circulating process vapor stimulating turbulent flow in the cooking zone about the food products and through the permeable conveyor serving to promote efficient heat transfer from the process vapor to the food products, subjecting the food products in another segment of said path to the cooking process vapor circulated at a second velocity laterally of the path, moving said food products through said cooking zone until the desired cooking therein is achieved and then moving the food products through the oven outlet, and moving the cooking process vapor from the cooking zone to circulate in a direction parallel to the path of conveyor movement and reheating the cooking process vapor in said oven outside of the cooking zone.

6. A method of cooking food products in an oven including an elongated housing having an inlet for food products to be cooked in the oven and an outlet for emitting food products from the oven, comprising passing food products into the housing upon a conveyor of generally permeable construction, subjecting the food products to a cooking process vapor being circulated laterally of the path of conveyor movement in planes above and below the conveyor in a cooking zone, the circulating process vapor stimulating turbulent flow in the cooking zone about the food products and through the permeable conveyor serving to promote efficient heat transfer from the process vapor to the food products, moving said food products through said cooking zone until the desired cooking therein is achieved and then moving the food products through the oven outlet, and moving the cooking process vapor from the cooking zone to circulate in a direction parallel to the path of conveyor movement and reheating the cooking process vapor in said oven outside of the cooking zone.

* * * * *